United States Patent [19]

Taille et al.

[11] Patent Number: 5,970,884
[45] Date of Patent: Oct. 26, 1999

[54] DEVICE FOR MOUNTING A MOTOR VEHICLE REAR WINDOW SHELF

[75] Inventors: Olivier De La Taille, Marly Le Roi; Vincent Du Penhoat, Quimper, both of France

[73] Assignee: Establissements Treves, Paris Cedex, France

[21] Appl. No.: 08/913,825

[22] PCT Filed: Apr. 5, 1996

[86] PCT No.: PCT/FR96/00525

§ 371 Date: Jan. 21, 1998

§ 102(e) Date: Jan. 21, 1998

[87] PCT Pub. No.: WO96/32301

PCT Pub. Date: Oct. 17, 1996

[30] Foreign Application Priority Data

Apr. 10, 1995 [FR] France ..................................... 9504247

[51] Int. Cl.⁶ ..................................................... B60R 5/04
[52] U.S. Cl. ............................... 108/44; 108/6; 296/37.16
[58] Field of Search ................................... 108/44, 45, 1, 108/6; 248/242, 291.1, 292.13, 292.14; 296/37.16

[56] References Cited

U.S. PATENT DOCUMENTS

| | | | |
|---|---|---|---|
| 1,309,144 | 7/1919 | Maise | 296/37.16 |
| 4,648,648 | 3/1987 | Shigesada et al. | 296/37.16 |
| 4,781,234 | 11/1988 | Okumura et al. | 296/37.16 X |
| 5,037,154 | 8/1991 | Senba et al. | 296/37.16 |
| 5,257,846 | 11/1993 | Kanai et al. | 296/37.16 X |
| 5,288,122 | 2/1994 | Pilhall | 296/37.16 X |
| 5,538,306 | 7/1996 | Ament | 296/37.16 X |

FOREIGN PATENT DOCUMENTS

| | | |
|---|---|---|
| 085851 | 1/1983 | European Pat. Off. . |
| 2641506 | 7/1990 | France . |
| 361249850 | 11/1986 | Japan ................................. 296/37.16 |
| 405139213 | 6/1993 | Japan ................................. 296/37.16 |

*Primary Examiner*—Peter M. Cuomo
*Assistant Examiner*—Hanh V. Tran
*Attorney, Agent, or Firm*—Dennison, Meserole, Scheiner & Schultz

[57] ABSTRACT

A removable rear shelf for a motor vehicle and lateral supports therefor. The shelf includes a pair of front corners and an abutment surface adjacent the front corners on the bottom surface of the shelf. Each of the lateral supports includes a surface on which the bottom surface of the shelf rests when installed in the motor vehicle, a coupling element which receives a front corner of the shelf and permits rotation of the shelf relative to the supports for installation and removal, and an abutment surface which is complementary with the abutment surface on the shelf to prevent rearward movement of the shelf when installed.

9 Claims, 6 Drawing Sheets

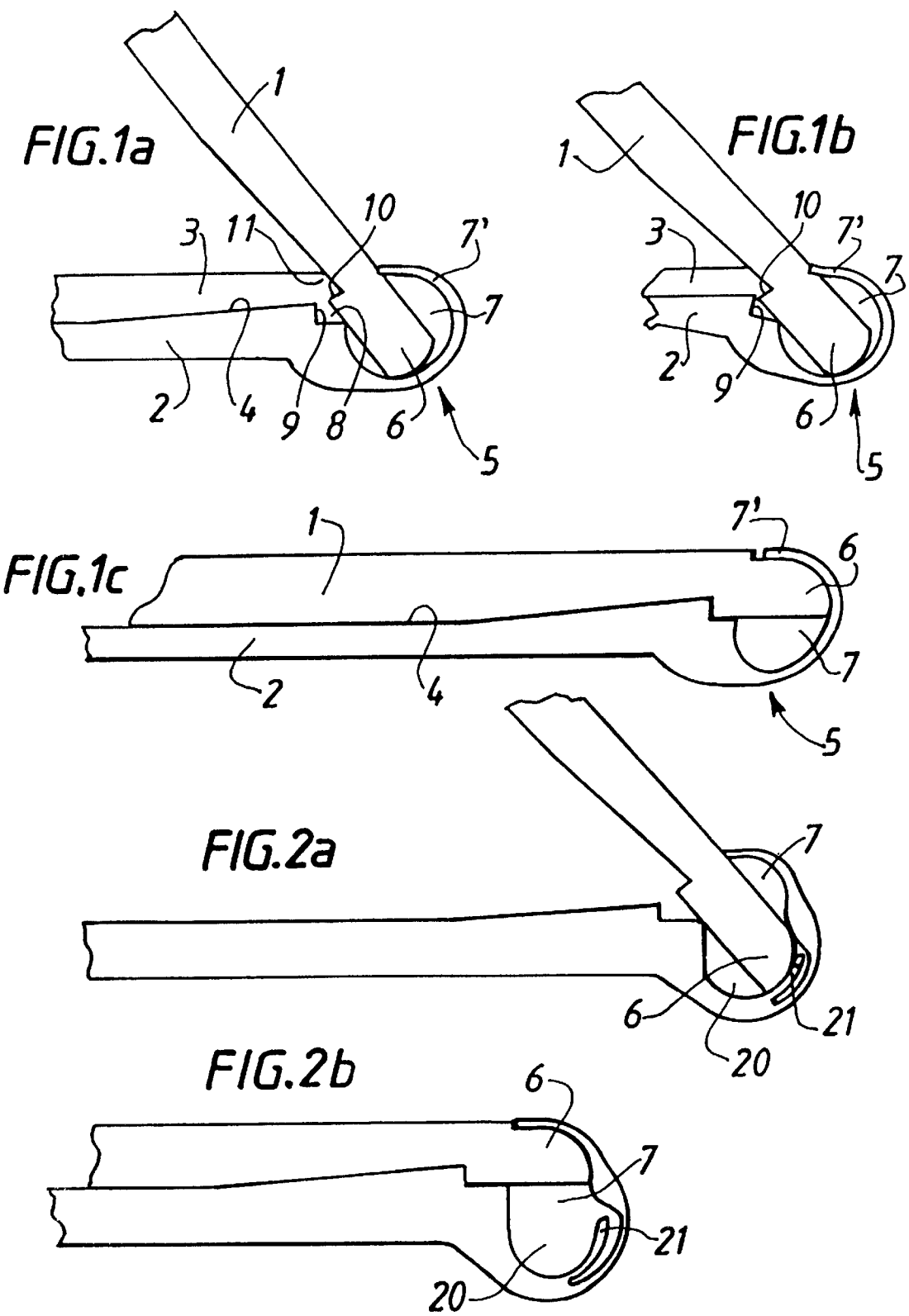

DEVICE FOR MOUNTING A MOTOR VEHICLE REAR WINDOW SHELF

BACKGROUND OF THE INVENTION

The present invention relates to a device for mounting the rear shelf of a motor vehicle and, more particularly, to such a device intended for mounting the shelf on its lateral supports.

Motor vehicles of the three-door or five-door type have, in a known way, a removable rear shelf, so as to make it possible for the volume located behind the back seat to be freed completely. Moreover, these shelves are usually mounted pivotably so as to be capable of being raised in order to have easier access to the boot. For this purpose, they are often attached to the rear tailgate by means of a flexible tie, so as to be raised at the same time as the latter.

In order to achieve these aims, the known shelves comprise an articulation system, for example two cylindrical fingers for support and rotation which are mounted on either side of the shelf, in the extension one of the other, perpendicularly to the plane of symmetry of the vehicle. These fingers may be mounted on the shelf by any known means, for example in the form of an insert, or else screwed into an insert which is itself moulded on. They are intended to engage into receiving pieces integral with lateral receiving supports which are themselves fastened to the chassis of the vehicle.

These devices have some disadvantages. In the first place, the fingers for support and rotation project beyond the lateral edges of the shelf when the latter is removed from its position of use. This results in a risk that these fingers may become caught while the shelf is being mounted or demounted and may damage the inner walls of the vehicle or damage themselves.

Furthermore, these arrangements are complicated, and therefore costly to manufacture, and they require parts, the number of which must be reduced as far as possible.

SUMMARY OF THE INVENTION

The present invention aims to mitigate these disadvantages.

To this effect, the subject of the invention is a device for mounting the rear shelf of a motor vehicle on its lateral supports, characterized in that it comprises the two front corners of the said shelf and two coupling elements integral with the said supports and arranged to receive the said corners, the said elements and said corners being arranged to allow the shelf to rotate relative to the said support, and complementary abutment surfaces being provided on the said corners and on the said coupling elements, in order to prevent a rearward movement of the shelf when it is in the substantially horizontal position of use.

In a particular embodiment of the invention, the said coupling elements are arranged to allow the corners to engage into the coupling elements by means of a forward movement of the shelf relative to its lateral supports, with the shelf being at a slight angle relative to the horizontal.

More particularly, the said corners and said coupling elements may be arranged to allow the said shelf to be extracted by means of a rearward and upward movement of this shelf relative to its lateral supports, with the shelf being at some inclination relative to the horizontal.

In particular, each of the said coupling elements may form a generally cylindrical cavity which has generatrices substantially perpendicular to the mid-plane of the vehicle and which is open at least on the same side as the said plane and between two generatrices, so as to form an orifice for the engagement of the said corners, the said orifice being generally directed upwards and rearwards.

More particularly, the said cavity may be delimited by a casing, of which at least the part near the orifice is elastic, the said corner having a thickness such that the said elastic part is deformed when the shelf is in the horizontal operating position.

There may be provision, in particular, for the said abutment surfaces to form a shoulder directed rearwards and formed on each of the said corners and a shoulder directed forwards and formed on each of the said coupling elements, the said shoulders co-operating when the said corners are engaged in the said coupling elements, with the shelf being in the substantially horizontal position.

The said coupling elements may, in particular, be arranged to allow a movement, as far as an abutment point, of the shelf forwards and downwards relative to its lateral supports, with the shelf being at some inclination relative to the horizontal, and to prevent a rotational movement of the shelf when it is at this abutment point.

More particularly, the said cavity may possess an extension generally directed forwards and downwards and capable of receiving the said corner when the said shelf is at the said some inclination.

The said extension may, in particular, possess, at its bottom directed forwards and downwards, elastic means arranged to allow a play of the said shelf in this direction.

The arrangement according to the invention makes it possible, in the first place, to limit the number of components, thereby simplifying the management of the replacement parts as regards both manufacture and after-sales services. This limitation of the number of components also tends towards obtaining products which can be recycled more easily.

Moreover, the industrialization of the product is simplified, in that the finishing operations are reduced considerably in relation to those of the prior art.

BRIEF DESCRIPTION OF THE DRAWINGS

Particular embodiments of the invention will now be described by way of non-limiting example, with reference to the accompanying diagrammatic drawings in which:

FIGS. 1a, 1b and 1c illustrate a diagrammatic side view of one of the variants of the invention, in which the shelf and its support are located in three different typical positions;

FIGS. 2a and 2b likewise illustrate a diagrammatic side view of two steps in the operation of another embodiment of the invention;

DESCRIPTION OF THE PREFERRED EMBODIMENT

Figure 3A:
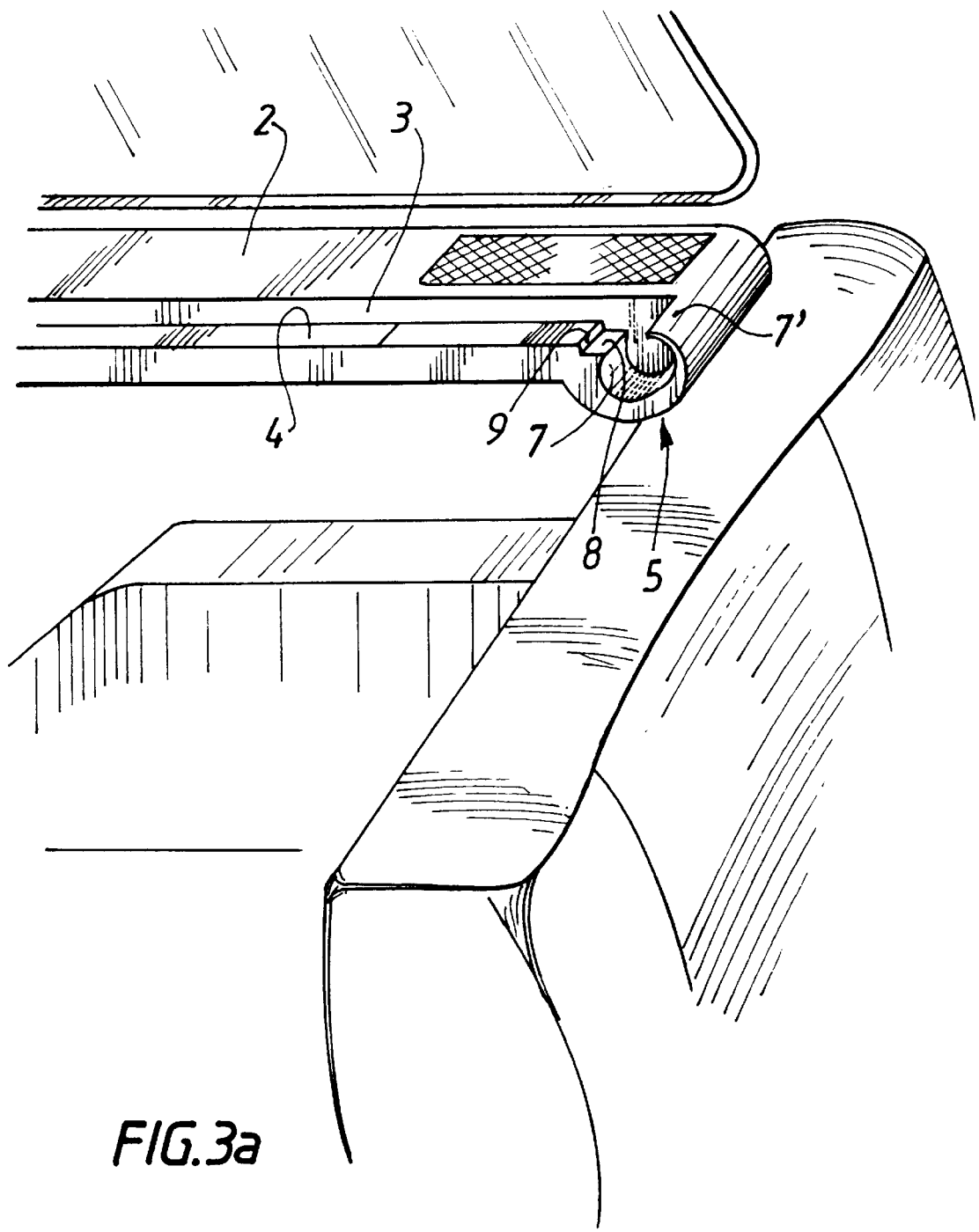
FIGS. 3a to 3d are perspective views illustrating the operation of the device of FIG. 1.

FIGS. 1 and 3 show a rear shelf 1 of a motor vehicle and a lateral shelf support 2. Of course, the vehicle possesses two lateral supports which are substantially symmetrical relative to the mid-plane of the vehicle. The support 2 forms, at its free edge, a setback 3 capable of receiving the corresponding edge of the shelf on a bearing surface 4 facing upwards, the upper surface of the shelf and its support then being level with one another.

At its front end, the support forms a coupling element 5 arranged to receive the corresponding front corner 6 of the shelf 1. This element 5 is formed essentially from a generally cylindrical cavity 7 having generatrices perpendicular to the mid-plane of the vehicle. This cavity is open upwards between two of its generatrices and on its side facing towards the mid-plane of the vehicle.

The cavity 7 is delimited by a casing 7' which has some elasticity, at least in the upper part near its orifice. The corner 6 of the shelf has a thickness such that, when the shelf is in the horizontal position, the upper part of the casing 7' is slightly deformed upwards and thus lays the shelf onto its supports, the effect of this being to limit its vibrations (in other words, the thickness of the corner 6 is greater than the vertical distance separating the free edge of the casing 7' from the horizontal surface of the setback 8 which will now be described.

The setback 3 terminates, in the cavity 7, in a second setback 8, the shoulder of which forms an abutment surface 9 facing towards the front of the vehicle. The abutment surface 9 is arranged to cooperate with a shoulder which forms a complementary surface 10 formed on the rear shelf 1 at the bottom of a recess 11, the said bottom being in the direction of the front of the vehicle.

The surfaces of the setback 8 and the complementary surfaces of the corner 6 are advantageously lined with rubber anti-noise pads which also make it possible to limit the wear attributable to friction in these zones.

Figure 3B:
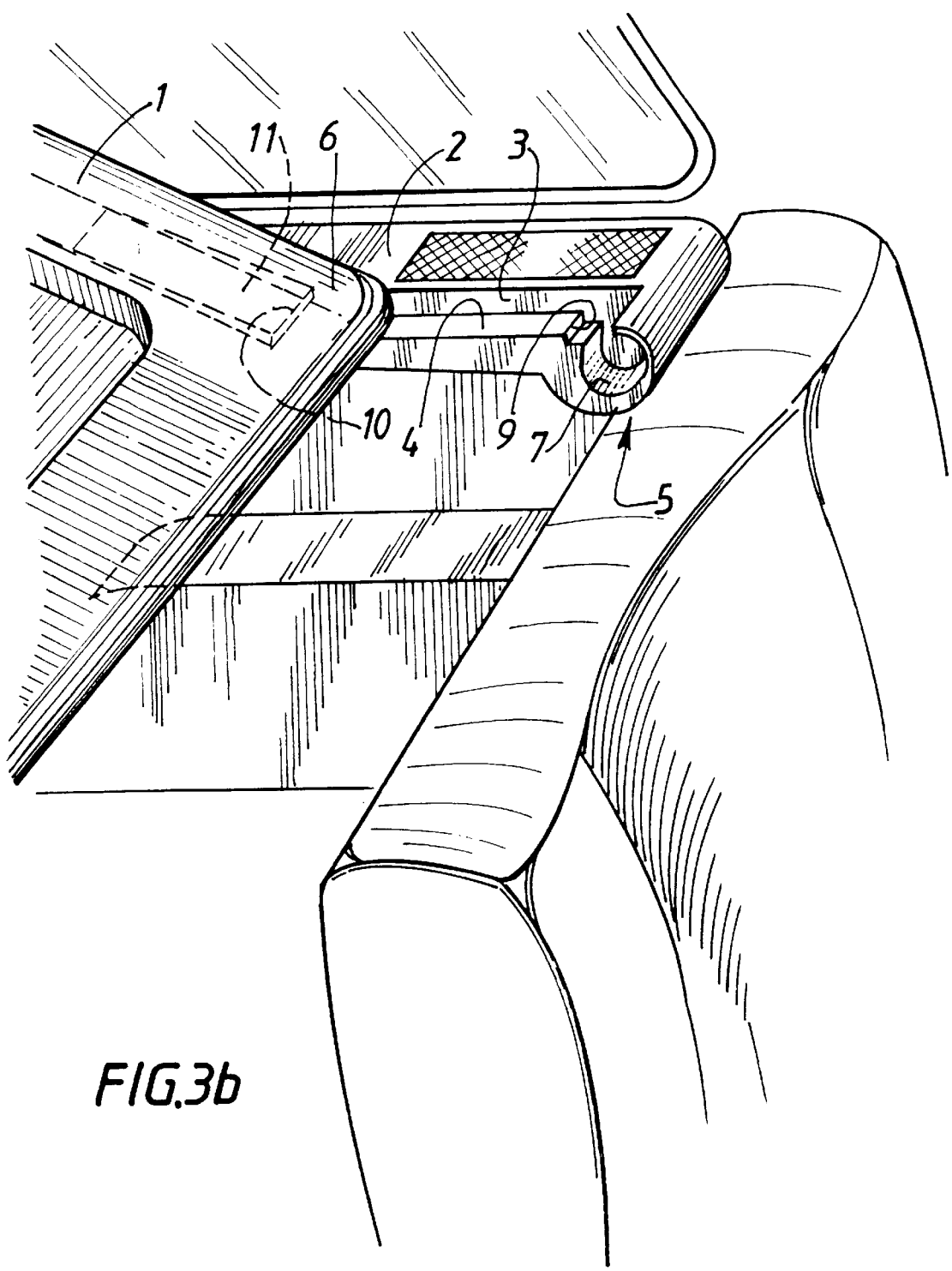
Figure 3C:
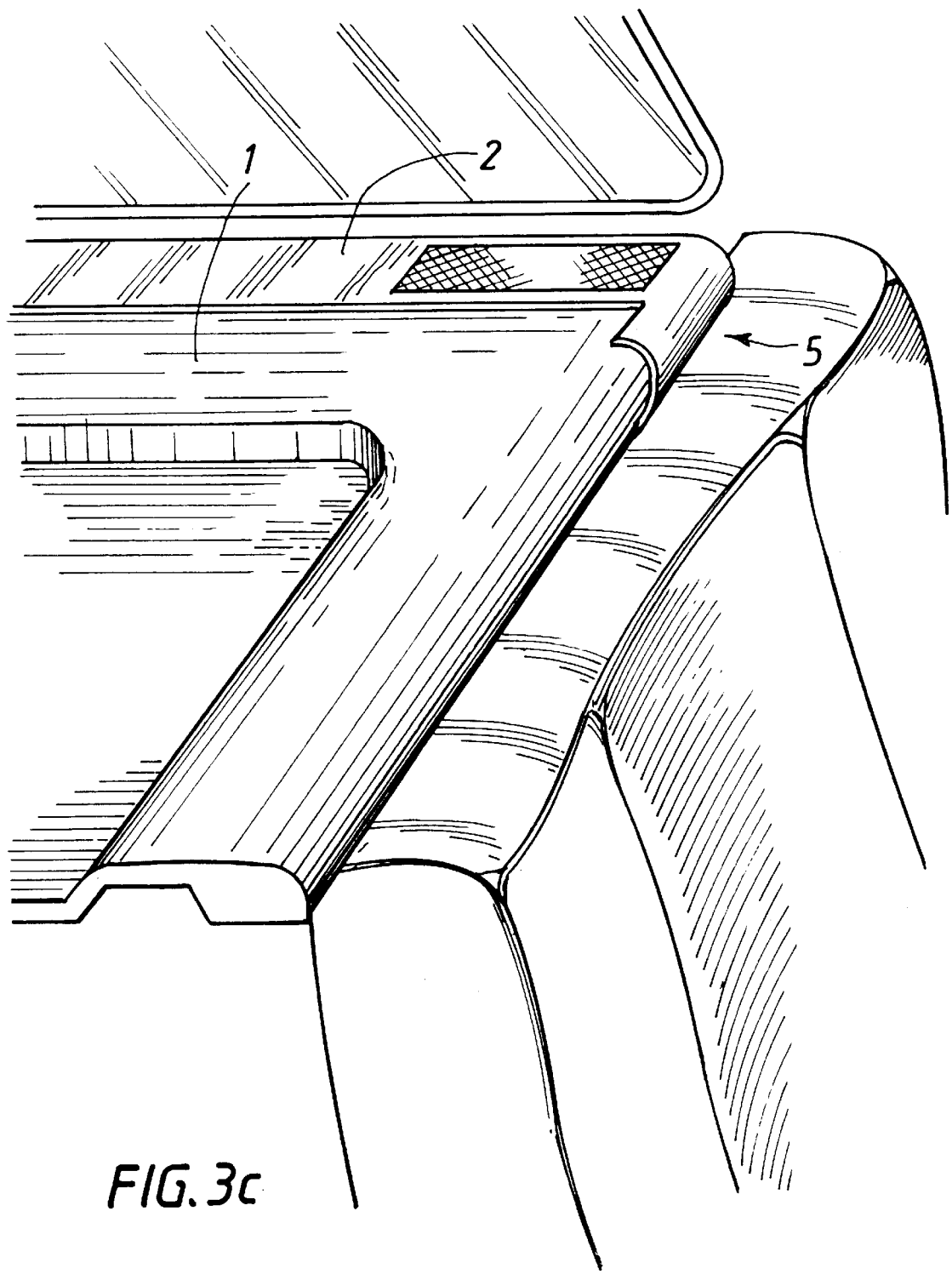
Figure 3D:
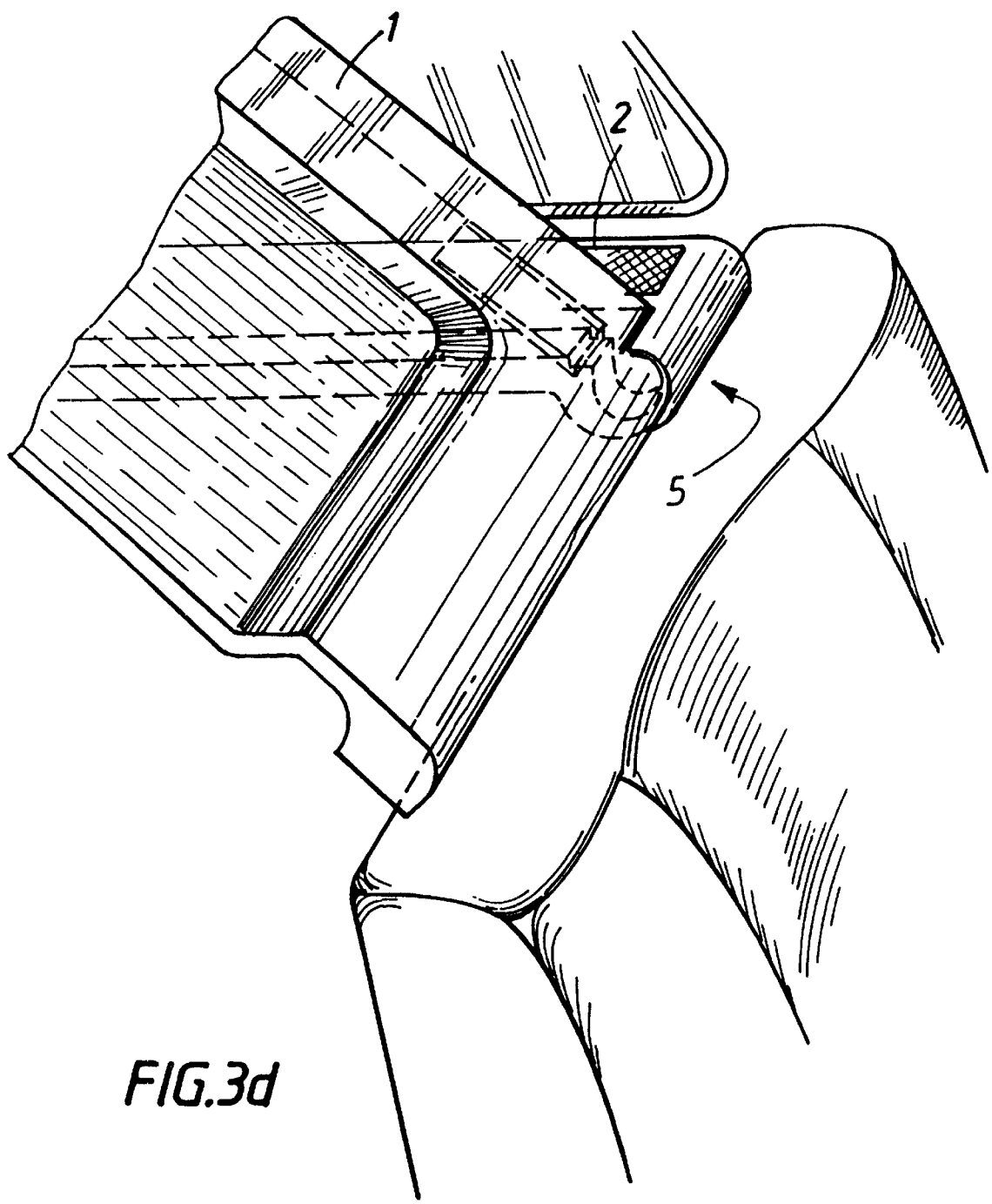

The shelf 1 is interdicted at its location by sliding its corners 6 forwards on the surfaces 4, whilst keeping it slightly inclined relative to its lateral supports 2. This step is illustrated in FIG. 3b.

When the shelf reaches the end of its travel, its corners engage into the cavities 7. The shelf can then be tilted horizontally into the position illustrated in FIGS. 1c and 3c. This position is its normal operating position, in which the abutment surfaces 9 and 10 prevent any rearward movement of the shelf 1.

In this position, the shelf may be raised in order to allow easy access to the boot, the front edge of the shelf sliding against the inner cylindrical wall of the cavity 7.

When the shelf 1 is to be removed, it is pivoted, as illustrated in FIG. 1, so that the abutment surfaces 9 and 10 are disengaged from one another. The shelf 1 may then be removed by drawing it upwards and rearwards.

Figure 4:
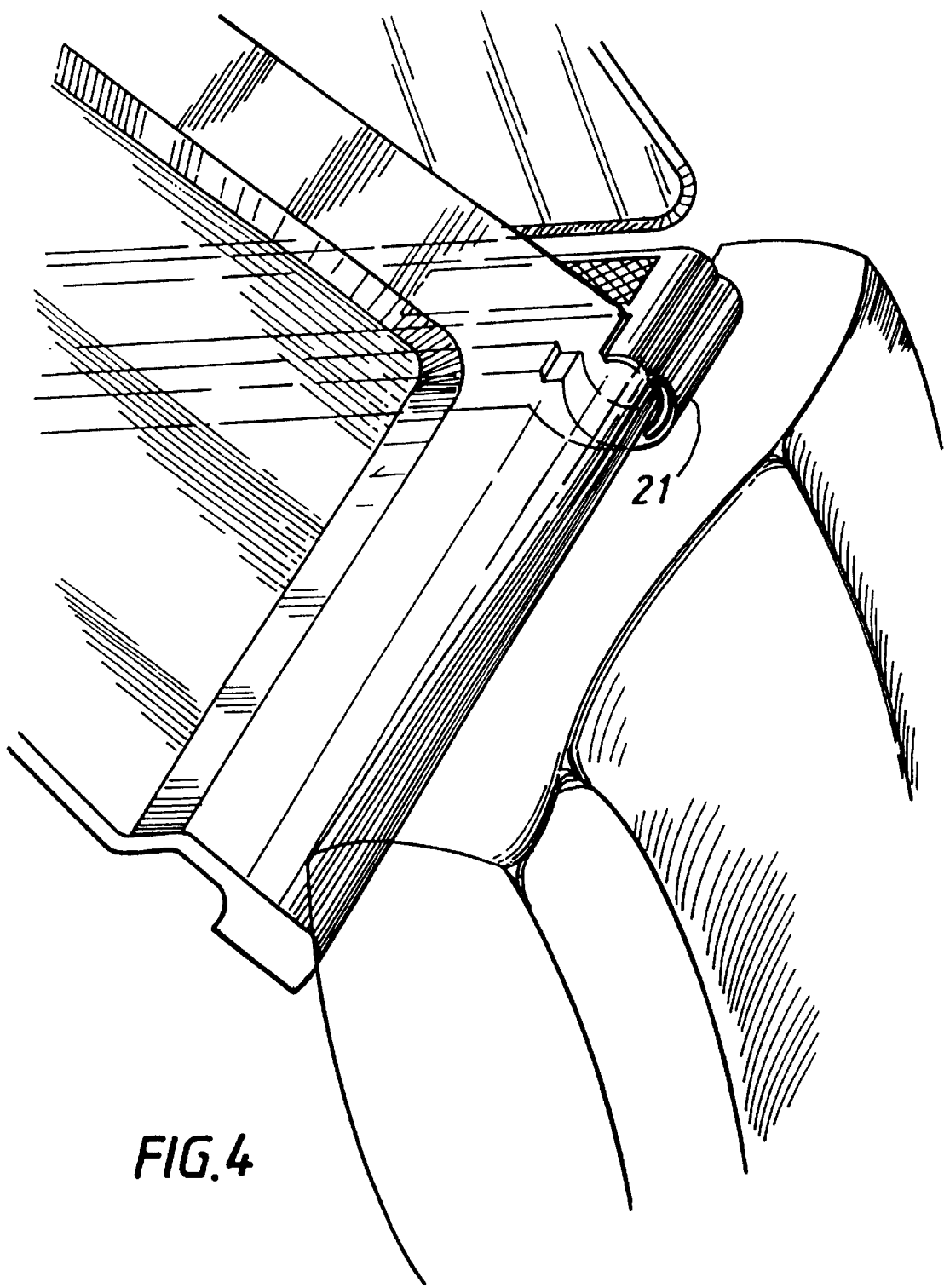
FIG. 4 is a view, similar to that of FIG. 3, relating to the device of FIG. 2.

FIGS. 2 and 4 differ from FIGS. 1 and 3 only in that, here, the cavity 7 is extended forwards and downwards at 20. When the shelf is in its operating position shown in FIG. 2b, it can be pivoted upwards into a position in which it may be displaced forwards and downwards into a new position, in which the front edge of the corner 6 can engage into the extension 20.

In this position, the shelf is in abutment against the edges of the cavity 7, thus making it possible to keep it in the position illustrated in FIG. 2a, without using the flexible ties which were mentioned above.

The shelf may be either removed or returned into the position of FIG. 2b by drawing it upwards and rearwards.

Moreover, FIGS. 2 and 4 show that the bottom of the extensions 20 of the cavities 7, the said bottom being in the downward and forward directions, is equipped with an elastic tongue 21, on which the front edge of the corner 6 comes to bear when the shelf 1 assumes the position shown in FIG. 2a. This tongue assists in releasing the shelf from the receptacle 7 for the purpose of turning it down into the horizontal position. It makes it possible, furthermore, to avoid the shelf experiencing excessive stresses and, in particular, breaking when it receives a jolt from the rear, for example under the action of the closing of the tailgate.

What is claimed is:

1. In combination, a removable rear shelf for a motor vehicle and lateral supports therefor, said rear shelf comprising a top surface and a bottom surface, a front edge and a rear portion, a pair of front corners at ends of the front edge and an abutment surface adjacent the front corners on the bottom surface of the shelf;

each of said lateral supports comprising a support surface on which the bottom surface of said shelf rests when installed in the motor vehicle, a coupling element constructed and arranged to receive one of said pair of front corners of the shelf and to permit rotation of the shelf relative to the supports for installation and removal, and an abutment surface which is complementary with the abutment surface on the shelf to prevent rearward movement of the shelf when installed.

2. A combination according to claim 1, wherein said corners and said coupling elements are constructed and arranged to permit the corners to engage the coupling elements by means of frontward movement of the shelf relative to the lateral supports, with the shelf being at a slight angle relative to a horizontal plane.

3. A combination according to claim 1, wherein said corners and said coupling elements are constructed and arranged to permit said shelf to be extracted from said supports by means of a rearward and upward movement of the shelf relative to the lateral supports, with the shelf being at an inclination to a horizontal plane.

4. A combination according to claim 1, wherein each of said coupling elements comprises a generally cylindrical cavity which is open in a direction generally perpendicular to the support surface so that the front edge of the shelf is retained between opposed lateral supports, the coupling elements further comprising an orifice opening into the cavity for engagement of said corners in the cavity, the orifice being generally directed upwards and rearwards.

5. A combination according to claim 4, wherein the cavity is defined by a casing, of which at least a portion near the orifice is elastic, said front corners having a thickness such that said elastic portion is deformed when the shelf is installed in the motor vehicle in a horizontal position.

6. A combination according to claim 4, wherein the cavity includes an extension generally directed frontwards and downwards and constructed and arranged to receive one of said pair of front corners when said shelf is at an inclination.

7. A combination according to claim 6, wherein said extension includes a bottom portion comprising elastic means directed frontwards and downwards and arranged to permit a play of the shelf in a frontward and downward direction.

8. A combination according to claim 1, wherein the abutment surface of said shelf comprises a shoulder directed rearwards, and the abutment surface of said coupling elements comprises a shoulder directed frontwards, the shoulders of said shelf and said supports cooperating when the shelf is installed in a substantially horizontal position.

9. A combination according to claim 1, wherein each of said coupling elements comprises an abutment point therein constructed and arranged to limit rotational movement of said shelf downwards relative to the lateral supports with the shelf at an inclination relative to horizontal.

\* \* \* \* \*